(No Model.)

I. B. POTTS.
DETACHABLE PIPE COUPLING.

No. 424,130. Patented Mar. 25, 1890.

Witnesses.
Wm. H. Brereton
K. Brereton

Inventor
Isaac B. Potts
By J. W. Tallmadge, Attorney.

UNITED STATES PATENT OFFICE.

ISAAC B. POTTS, OF COLUMBUS, OHIO.

DETACHABLE PIPE-COUPLING.

SPECIFICATION forming part of Letters Patent No. 424,130, dated March 25, 1890.

Application filed November 5, 1889. Serial No. 329,331. (No model.)

*To all whom it may concern:*

Be it known that I, ISAAC B. POTTS, a citizen of the United States, residing at Columbus, in the county of Franklin and State of Ohio, have invented a new and useful Improvement in Detachable Pipe-Couplings, of which the following is a specification.

My invention is a detachable pipe-coupling; and my said invention consists of certain details of construction of the parts composing the same, as and for the purposes as will be hereinafter more fully described and form the subject-matter of the annexed claims.

The object of this invention is to provide a simple and convenient pipe-coupling for joining the ends of pipe without skilled labor or the use of solder, screw-threads, &c., and to this end I proceed as follows, reference being had to the accompanying drawings, forming a part hereof, wherein—

Figure 1:
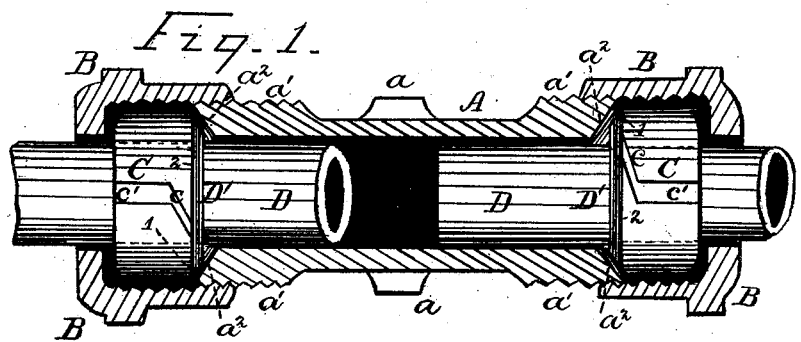
Figures 2, 3:
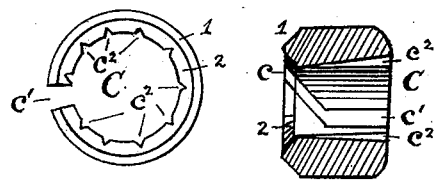

Figure 1 is a view in central longitudinal sectional elevation of a detachable pipe-coupling constructed according to my invention; and Figs. 2 and 3, detail views, on an enlarged scale, of the split ring.

This coupling is composed of a union A, having screw-threaded extremities $a'$, nuts B B, and split rings C C. D D are ends of pipe being coupled. The union A is formed exteriorly with lateral projections or ribs $a$, for the purpose of holding the union when applying the coupling in position, and its outer ends are countersunk or tapered inwardly, as at $a^2$. The rings C C are, as before stated, split or divided, and, as shown in Fig. 2, this split is made partially at an angle longitudinally of the ring, as at $c$, and partially straight, as at $c'$, and longitudinally of the interior surface of the ring is a series of grooves $c^2$, which grooves are made deeper and wider at one end than at the other, as shown in Fig. 3. In addition to this, the top inner edges of these rings are inclined or outwardly tapered, as at 1, to conform to the incline $a^2$ of the ends of the union A, and with an inward taper or countersunk portion 2, to receive the packing D'. The rings being split diagonally of their length, they may be compressed around pipe of small diameter, and the interior grooves in said ring render it flexible and so that it will readily conform to any irregularities in the pipes being united, and as said grooves are made wider and deeper at one end than at the other this end of the ring will be compressed the most, so that a tight joint is the result.

To apply the coupling, the union A is held by the ribs $a$. The nuts B B and next the rings C C are slipped one upon each of the ends of the pipe to be coupled, with a ring of soft packing against the countersunk ends 2 of said rings. The ends of the pipe are now inserted into the ends of the union and the nuts B B screwed upon said union, whereupon the nuts are brought against the outer ends of the rings C C and said rings forced upon the ends of the union. The end of the union being tapered inward and a similar outward taper being given to the rings they are, as the said rings press against the union laterally, compressed upon the pipe being coupled, the split and interior grooves thereof rendering such movement of the rings possible.

I claim—

1. In a pipe-coupling of the nature described, the ring split or divided diagonally of its length and with inclined shoulder upon its inner top edge and interior grooves made wider and deeper at one end than at the other across the interior, combined with the union and nuts, substantially as described, for the purposes specified.

2. The combination, in a pipe-coupling, with the union A, having ribs $a$ and screw-threaded countersunk ends $a'$ $a^2$, and coupling-nuts B B, of the diagonally-split rings C C, having tapered ends 1, corresponding to the taper of the ends of the union, and interior incline or countersunk portion 2 and grooves $c^2$, made wider and deeper at one end than at the other, extending longitudinally across the interior of the ring, and packing D, all constructed and arranged as and for the purposes described.

ISAAC B. POTTS.

Witnesses:
L. L. RANKIN,
L. B. BROWN.